United States Patent [19]
Ruminski et al.

[11] Patent Number: 5,900,813
[45] Date of Patent: May 4, 1999

[54] VEHICLE TURN SIGNAL

[75] Inventors: Stanley Ruminski, 760 Cambridge Dr., Burr Ridge, Ill. 60521; William Carrell, Anderson, Ind.

[73] Assignee: Stanley Ruminski, Burr Ridge, Ill.

[21] Appl. No.: 09/048,444

[22] Filed: Mar. 26, 1998

Related U.S. Application Data

[63] Continuation-in-part of application No. 08/950,302, Oct. 14, 1997.

[51] Int. Cl.$^6$ ........................................... B60Q 1/34
[52] U.S. Cl. ..................... 340/475; 340/465; 340/471; 340/478; 362/61; 40/442; 40/588; 40/589; 40/902
[58] Field of Search ................................ 340/463, 465, 340/468, 471, 472, 475, 478; 362/61; 40/124.02, 442, 588, 589, 902

[56] References Cited

U.S. PATENT DOCUMENTS

| | | | |
|---|---|---|---|
| 4,622,494 | 11/1986 | Johnson | 340/475 |
| 5,426,414 | 6/1995 | Flatin et al. | 340/472 |
| 5,574,428 | 11/1996 | Groover | 340/468 |
| 5,604,480 | 2/1997 | Lamparter | 340/433 |

FOREIGN PATENT DOCUMENTS

2178516  2/1987  United Kingdom .

Primary Examiner—Daniel J. Wu
Attorney, Agent, or Firm—Ryan Kromholz & Manion, S.C.

[57] ABSTRACT

The invention comprises a vehicular wide turn warning device having a placard with a warning printed thereon. The placard also has mounted thereon a strobe lamp and a plurality of light-emitting mechanisms, the light-emitting mechanisms being arranged to form an arrow having a point and a tail. The invention also comprises a control circuit for operating the light-emitting mechanisms and strobe lamp mounted upon the placard. The control circuit is arranged such that the light-emitting mechanisms forming the arrow are sequentially and cyclically illuminated beginning with the light-emitting mechanisms forming the tail of the arrow and preceding to the light-emitting mechanisms forming the head of the arrow. The strobe lamp is cyclically illuminated in conjunction with the light-emitting mechanisms forming the arrow. A manually operable switching means located adjacent a driver of a vehicle activates a control circuit for the vehicular wide turn warning device. The vehicular wide turn warning device is utilized by mounting at least two of the vehicular wide turn warning devices upon a vehicle, at least one of the devices being placed upon the rear of the vehicle and at least one more of the devices being placed upon one of the sides of the vehicle. By operating the manually operable switching means the control circuit is activated and the vehicular wide turn warning device operates so as to inform motorists of an imminent wide turn to be performed by the vehicle upon which the vehicular wide turn warning devices are mounted.

3 Claims, 6 Drawing Sheets

VEHICLE TURN SIGNAL

BACKGROUND OF THE INVENTION

The present application is a continuation-in-part of copending application Ser. No. 08/950,302, filed with the U.S. Patent and Trademark Office on Oct. 14, 1997.

The present invention relates to the field of turn signals for automobiles and more specifically to turn signals for use with larger vehicles that are accustomed to making wide turns. The present invention is particularly applicable to vehicles such as tractor-trailer combinations and to other cargo vehicles, such as garbage trucks.

Large cargo vehicles, such as tractor-trailers and garbage trucks, are not able to make precise 90° turns. It is well known that the longer a vehicle is the wider the radius necessary for turning. Because cargo vehicles cannot make precise turns, these vehicles may pose a safety hazard for motorists driving smaller vehicles. To remedy this, manufacturers and operators of cargo vehicles have placed warning placards on the rear of these cargo vehicles warning motorists to be aware that the vehicle may need to make a wide turn. In addition to this, manufacturers and operators of cargo vehicles have also begun to place additional turn signals on the sides of cargo vehicles in order to warn motorists that there is a wide turn in progress. The problem with the placards and additional turn signals is that they are not sufficiently visible to catch the attention of many motorists. It is therefore an objective of this invention to create a wide turn signal that is highly visible. A further objective of this invention is to create a highly visible wide turn signal that more clearly conveys a wide turn warning than the prior art turn signals or placards, whereby motorists and/or pedestrians are alerted to the fact that vehicle is in the process of making a wide turn.

SUMMARY OF THE INVENTION

The present invention is a vehicular wide turn warning device comprising a placard that has printed on it a warning message and which also has mounted thereon a strobe lamp and a plurality of light-emitting mechanisms. The light-emitting mechanisms are arranged upon the placard to form an arrow that has a point and a tail. The vehicular wide turn warning device is also provided with a control circuit for illuminating the strobe lamp and the light-emitting mechanisms.

The control circuit itself is comprised of a plurality of branches, each having a first end and second end. The first end of each of the branches is connected to a common direct current power source and the second end of each of the branches is connected to a respective output terminal of the grounded current amplifier. Each branch has at least one light-emitting mechanisms connected intermediate the ends. Each branch is also coupled to the succeeding branch by a jumper connection that includes a diode mechanism that is biases away from the preceding branch. Furthermore, each output terminal of the current amplifier respectively corresponds to an individual current amplifier input terminal.

7/6 control circuit is further comprised of a grounded synchronous counter that is also connected to the power source. The synchronous counter has a plurality of output terminals each of which is connected to a respective current amplifier input terminal. The synchronous counter is also arranged for activation by a switching mechanism, which may or may not be manually operated. A grounded timer means is intercoupled between the power source and the synchronous counter.

Each branch of the control circuit of the vehicular wide turn warning device may further be comprised of a plurality of light-emitting mechanisms, the light-emitting mechanisms of each branch being connected in parallel relation to each other. In addition, the vehicular wide turn warning device may be further comprised of a strobe lamp that has an input and an output, the input of the strobe lamp being connected to the power source and the output of the strobe lamp being connected to the collector of a transistor, the emitter of the transistor being connected to ground and the base of the transistor being connected to the synchronous counter via the current amplifier, such that when an electrical signal is present at the base of the transistor a current may flow from the power source to the ground connection through the strobe lamp thereby illuminating it.

The control circuit of the vehicular wide turn warning device may be activated by a switching mechanism comprised of a turn signal circuit arranged to be activated by a driver of a vehicle, the turn signal circuit having an output for activating the control circuit that conveys an electrical signal via the current amplifier to the synchronous counter, such that when an electrical signal is present on the turn signal circuit output, the control circuit is activated.

It is also contemplated that the switching mechanism may be further comprised of a second switching mechanism arranged to be activated by a driver of a vehicle. The second switching mechanism has an output for activating the control circuit that conveys an electrical signal via the current amplifier to the synchronous counter, such that when an electrical signal is present on the second switching mechanism output, the control circuit is activated to independently operate a strobe lamp.

The timer means of the control circuit is capable of producing timing signals having a plurality of different frequencies. The frequency of the timing signals determines the rate at which the light-emitting mechanisms and strobe light are illuminated. The light-emitting mechanisms of each branch are sequentially and cyclically illuminated beginning with the light-emitting mechanisms that form the tail of the arrow and proceeding to light-emitting mechanisms that form the head of the arrow. Furthermore, the strobe lamp is generally cyclically illuminated in conjunction with the light-emitting mechanisms, though it is to be understood that the strobe light may also be operated independent from the light-emitting mechanisms. The illumination of the light-emitting mechanisms and the strobe tend to draw attention to the warning message printed upon the placard, the warning message indicating that the vehicle will make a wide turn.

Further, it will be apparent to the person of skill in the art, subsequent to reading the present specification, to apply the circuit of the present invention or its equivalents for use in an integrated circuit or equivalent structure. This invention also includes a method for using a vehicular wide turn warning device comprised of the steps of mounting on a vehicle having a rear portion and a first and second side portions at least two vehicular wide turn warning devices. At least one of the vehicular wide turn warning devices is mounted upon the rear portion of the vehicle and at least one other vehicular wide turn warning device will be mounted on one of the first or second side portions of the vehicle. At least one of the vehicular wide turn warning devices will be activated by operating a switching means; at least one of the vehicular wide turn warning devices will indicate that a wide turn will be performed by the vehicle. In addition, the switching means may be operated in such a manner as to activate only a strobe light.

Further, the present invention will have particular application, especially when used in conjunction with a strobe light mechanism or other warning mechanism, in situations such as nighttime or twilight use of the vehicle, whereby the vehicle's may be further enhanced by activating the strobe light mechanism.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
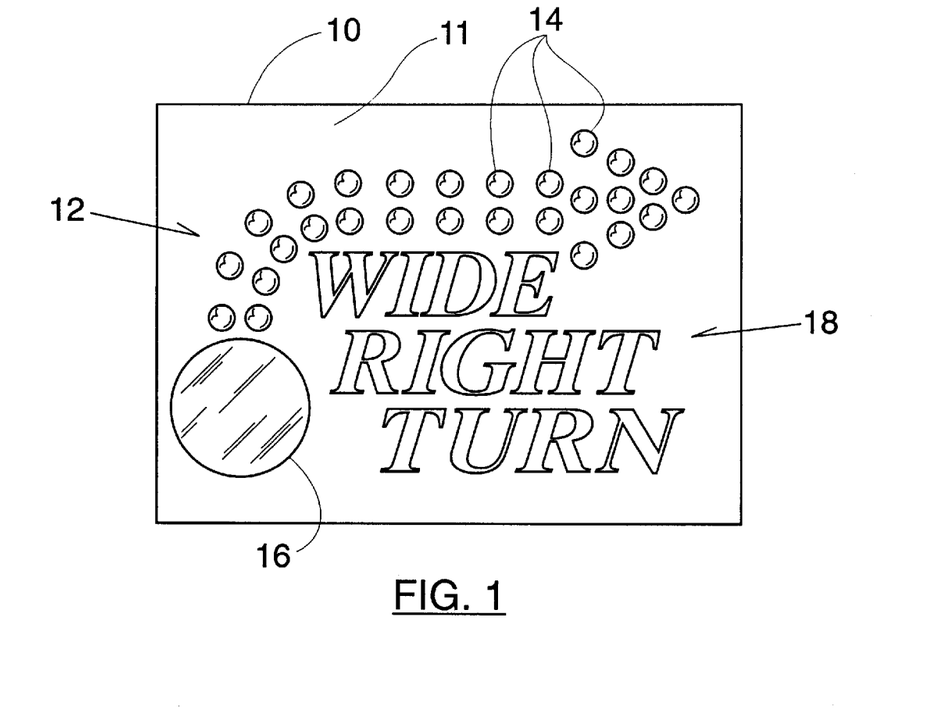
FIG. 1 is a depiction of the placard of the wide turn signal.

Referring now to FIG. 1, the wide turn signal 10 is comprised of a face plate or placard 11 that can be of any useful shape (e.g. circular, triangular, etc.), but is in this embodiment preferably rectangular. Depicted upon the face plate 11 is an arrow 12, the arrow being formed of individual light-emitting diodes 14. A strobe lamp 16 is located at the tail end of the arrow 12. Also included on the face plate is a message 18, in this embodiment consisting of the words "WIDE RIGHT TURN;" of course the message could be of any type including simply "WIDE TURN" or even "WIDE LEFT TURN."

Figure 2:
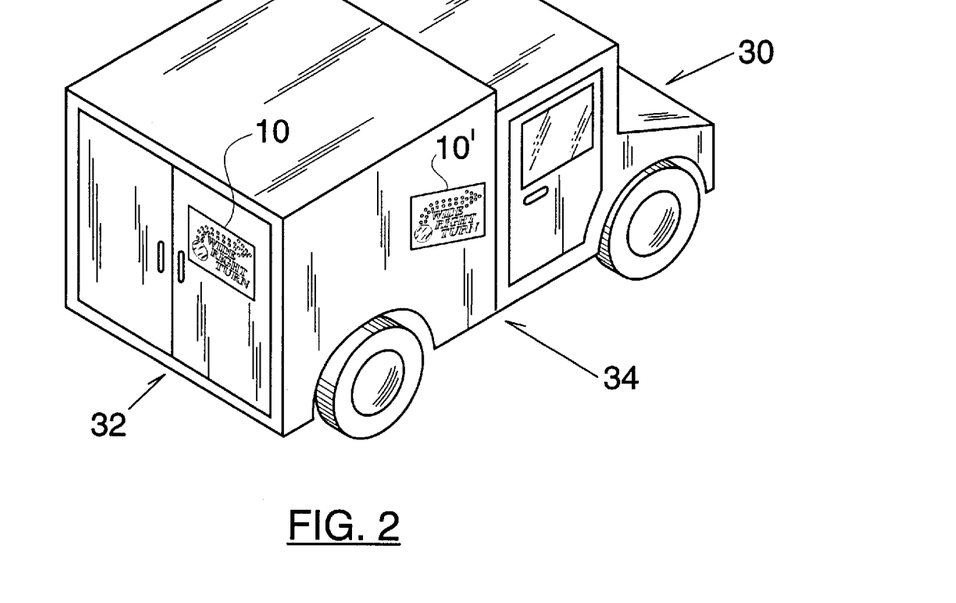
FIG. 2 is a pictorial representation of a vehicle showing the proper placement of the wide turn signal placard when used to indicate wide right turns.

FIG. 2 shows the preferred placement of the wide turn signal 10 upon a cargo vehicle 30. It is important to note here that though this embodiment depicts the wide turn signal being used to warn of wide right turns, the turn signal may be modified to warn of wide left turns as well. In the present embodiment, proper usage includes a first turn signal 10 being affixed to the rear 32 of the cargo vehicle 30 and a second turn signal $10^1$ being affixed to the side panel 34 of a cargo vehicle 30. This arrangement of turn signals 10 and $10^1$ permits a motorist (not shown) traveling behind the cargo vehicle 30 or approaching a cargo vehicle in an adjacent lane to be initially made aware of the cargo vehicle driver's intent to make a wide turn, the second turn signal $10^1$ on the side panel 34 becoming visible to the motorist once the cargo vehicle has begun to make its wide turn. In this arrangement the lighted turn signals 10 and $10^1$ are visible throughout the entire turn of the cargo vehicle 30.

Figure 3:
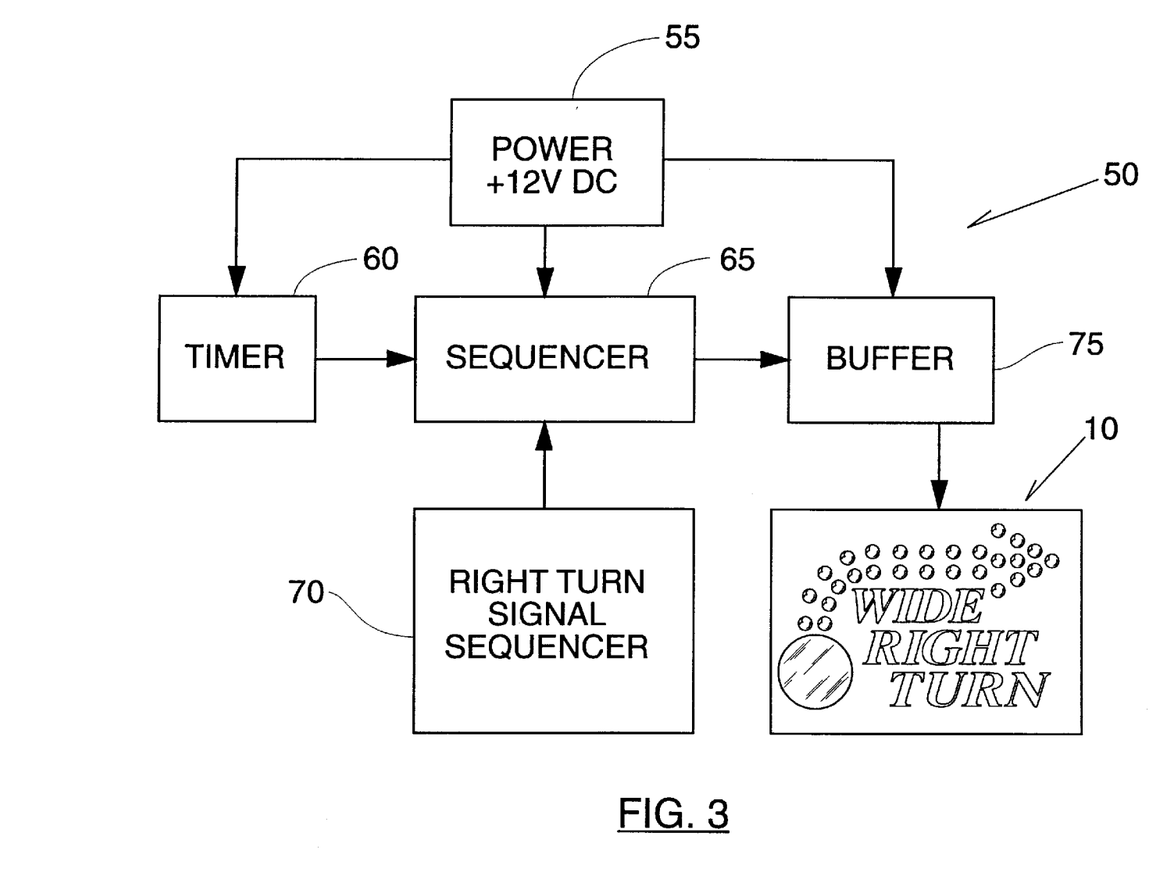
FIG. 3 is a schematic view showing the inter-relationship of the various elements that comprise the wide turn signal.
Figure 4A:
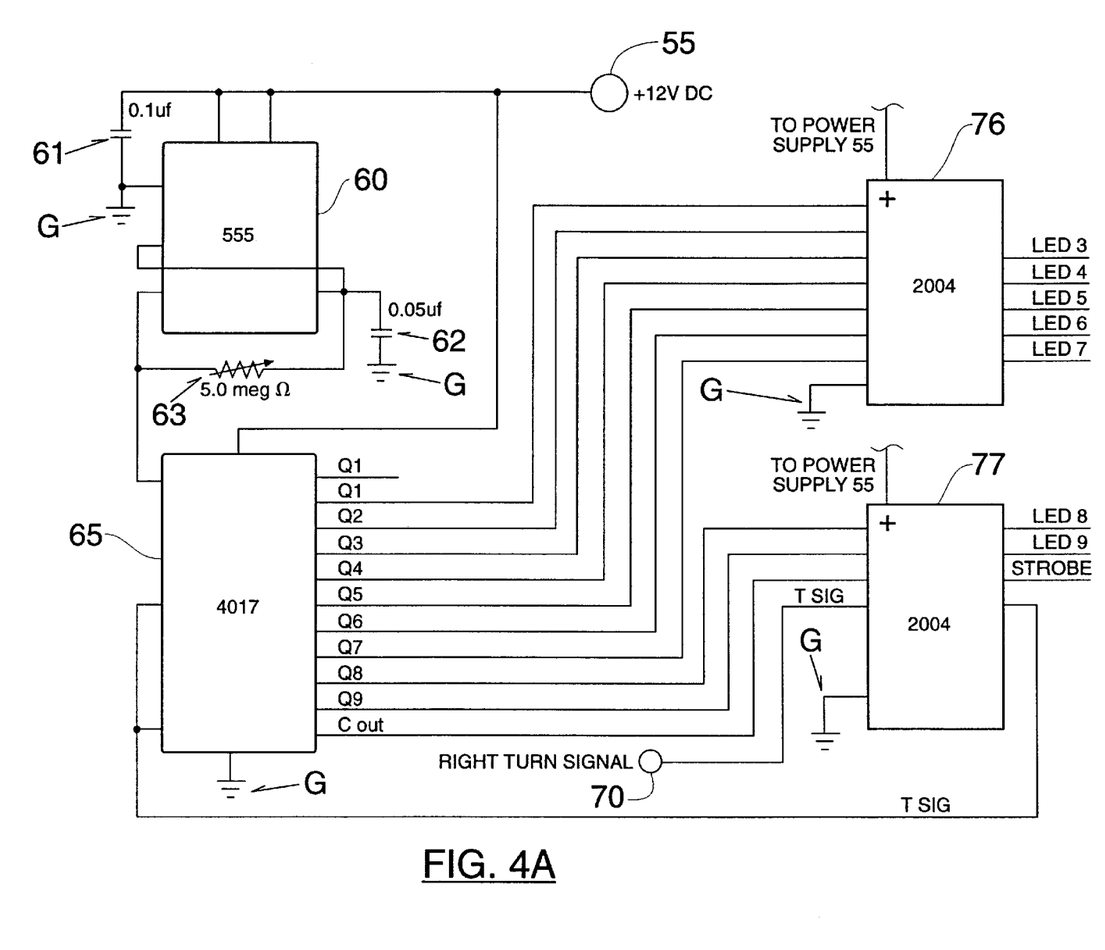
FIG. 4a is of a first portion of a wiring schematic view of the wide turn signal components.
Figure 4B:
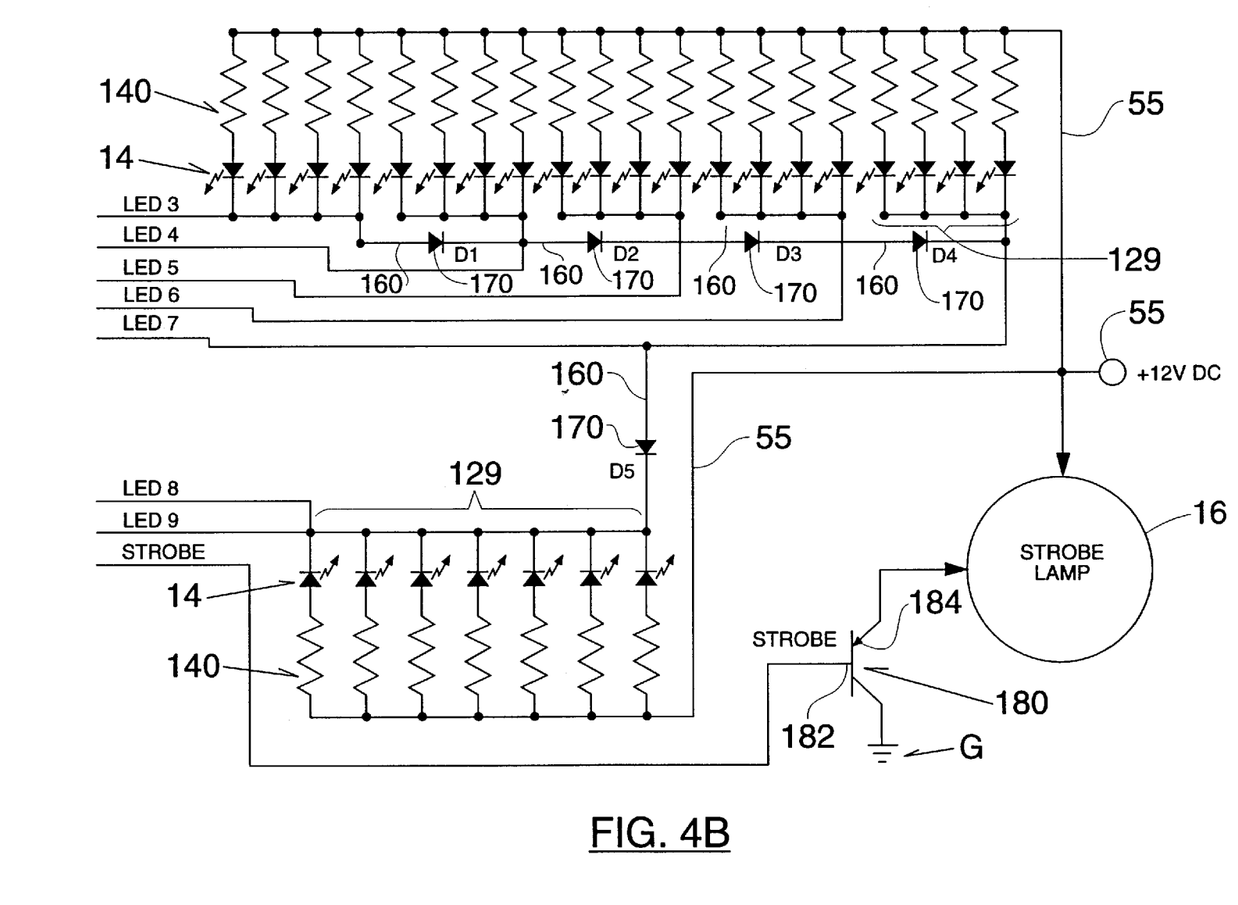
FIG. 4b is of a second portion of the wiring schematic view of the wide turn signal components.

FIG. 3 depicts schematically how the various elements of the control circuit 50 interact to operate the wide turn signals 10 and $10^1$. A power source 55, generally being the wiring harness of the vehicle 30 supporting the wide turn signals 10 and $10^1$, supplies a nominal direct current voltage of 12 volts. The power source 55 is electrically connected to a timer 60, a sequencer 65, and a buffer 75. Generally speaking, the timer 60 uses the 12 volt current supplied by the power source 55 to create an evenly spaced electrical signal that is sent to the sequencer 65. The sequencer 65 receives the timed voltage signals from the timer 60, and sequentially directs the voltage signals to individual groupings of light-emitting diodes 14 and to the strobe lamp 16 of the wide turn signal 10 via the buffer 75. A right turn signal circuit 70 is electrically connected to the sequencer 65 in such a manner that the sequencer 65 will not send signals to the buffer 75, unless there is a voltage signal being received at the sequencer 65 from the right turn signal circuit 70. The right turn signal circuit may itself be activated by means of a manually operable switch located within reach of the driver of the cargo vehicle 30. The electrical signals received at the buffer 75 from the sequencer 65 have their current amplified by the buffer 75 whereupon the electrical signals are conducted to the individual groupings of light-emitting diodes 14 and the strobe lamp 16. The electrical signals received by the light-emitting diodes 14 and the strobe lamp 16, in the sequence dictated by the sequencer 65, results in the normal operation of the turn signal 10. Referring next to FIGS. 4a and 4b, a more detailed depiction of the control circuit 50 can be seen. The timer 60 is electrically connected to the power source 55. It is preferred to use an integrated circuit timer such as a "555" timer however, an equivalent integrated or discrete circuit may be used instead. An example of an acceptable 555 timer for use with the control circuit 50 is the LMC555 presently manufactured by National Semiconductor of Arlington, Tex. The timer 60 generates a series of timing pulses from zero to twelve volts, or from 12 volts to zero volts; the voltage range may vary depending upon the power source used. The frequency of the pulses is dependent upon the relative values of the capacitor 62 and the variable resistor 63. A capacitor 61 is used to absorb any undesired transients that are generated external to the control circuit 50. The timer 60 is electrically connected between the power source 55 and the sequencer 65 in a manner well known in the art.

The sequencer 65 receives the timing pulses from the timer 60. It is preferred that the sequencer 65 be an integrated circuit such as the CD4017 DIVIDE-BY-10 COUNTER WITH 1-OF-10 OUTPUTS presently manufactured by National Semiconductor of Arlington, Tex., however an equivalent integrated equivalent discrete circuit may be used. The timing pulses cycle the sequencer 65 through a ten count sequence, each count corresponding to a specific output Q0 through Q9, respectively. When the sequence reaches output Q9, the sequencer 65 returns to output Q0 for the first count of the next sequence. This sequence is repeated for as long as an electrical signal is received from the right turn signal circuit 70; that is, so long as the wide turn signal is on.

On the first count of the sequence corresponding to output Q0 a twelve-volt signal is sent out over output C-OUT. The twelve-volt signal is present at output C-OUT for the first five counts of the sequence corresponding to outputs Q0 to Q4, and off, i.e. receiving a zero voltage signal, for the last five counts corresponding to outputs Q5 to Q9 of each cycle.

As can be seen from FIG. 4a, output Q0 terminates with no electrical connection. Outputs Q1 and Q2 are electrically connected to buffer 76 and are grounded by buffer 76 to ground G, having no continuing electrical connection thereafter. Sequencer 65 outputs Q3 to Q7 are electrically connected to the buffer 76 which amplifies the current of the electric signal received from sequencer 65, passing each respective electric signal to an individual, corresponding buffer output labeled LED3 to LED7, respectively. Sequencer 65 outputs Q8 to Q9 and C-OUT are electrically connected to buffer 77 which also amplifies the current of the electric signals received from sequencer 65 and conducts the signals to individual corresponding buffer outputs labeled LED8, LED9, and STROBE, respectively.

Buffers 77 and 76 are preferably integrated circuits such as the HIGH CURRENT/VOLTAGE DARLINGTON DRIVERS Model DS2004 presently manufactured by National Semiconductor of Arlington, Tex., though any equivalent integrated or discrete circuit may be used. Each output of buffer 76, LED3 to LED7 respectively, is electrically connected to four light-emitting diodes 14, each group of four light-emitting diodes 14 forming a cluster 129. Each light-emitting diodes 14 of each cluster 129 is electrically connected in parallel relation to the other light-emitting diodes 14 in the cluster 129 between the power source 55 and the respective buffer 76 output LED3 to LED7 as illustrated in FIG. 4b. Each parallel branch of each cluster 129 contains a light-emitting diodes 14 and a resistor 140 interposed between the light-emitting diodes 14 and the power source 55. Further, each cluster 129 is interconnected by a jumper 160, each jumper 160 having connected in-line a diode 170. Each diode 170 is biased away from the preceding cluster 129. The jumpers 160 are connected in such a way as to electrically connect in parallel each of the clusters 129 defined by each of the buffer 76 outputs LED3 to LED7.

Buffer 77 outputs LED8 and LED9 are electrically coupled to each other and to a cluster 129 of light-emitting diodes 14. The cluster 129 of light-emitting diodes 14 connected to the coupled outputs LED8 and LED9 has in this embodiment seven light-emitting diodes 14, and like the aforementioned clusters 129 each parallel branch of the cluster 129 defined by outputs LED8 and LED9 and the power source 55 also contains a resistor 140. In addition, a jumper 160 is interconnected between the output LED7 and the cluster 129 defined by outputs LED8 and LED9 and the power source 55.

Diodes 170 connected inline to jumpers 160 are arranged so as to be biased away from buffer 76. Furthermore, the diode 170 contained in the jumper 160 interconnecting outputs LED7 and outputs LED8 and LED9 is also biased away from buffer 76.

Buffer 77 output STROBE is electrically connected to the base 182 of a transistor 180 used to operate the strobe lamp 16. The strobe lamp 16 is connected in series between the power source 55 and the collector 184 of transistor 180. The emitter 186 of transistor 180 is electrically connected to ground G, illuminating the strobe lamp. The transistor 180 operates in such a manner that when there is a voltage present at output STROBE and hence at the base 182 of the transistor 180, electrical current is allowed to flow from the power source 55 through the strobe lamp 16 to the collector 184 of the transistor 180 through the base 182 to the emitter 186 and to ground G. The absence of an electrical current at the base 182 of transistor 180 prevents the flow of current from the power source 55 to ground G through the transistor 180.

Output buffer 77 also has an input from the right turn signal circuit 70 that corresponds to output TSIG. The presence of an electrical signal at output TSIG of buffer 77 activates the entire control circuit 50 of the wide turn signal 10. The absence of an electrical signal at output TSIG of buffer 77 from the right turn signal circuit 70 maintains the wide turn signal 10 in an off mode. The electrical signals received from the right turn signal circuit 70 by buffer 77 have their current amplified by buffer 77 whereafter the electrical signals from the right turn signal circuit 70 are conducted by output TSIG to sequencer 65. The appearance of electrical signals from the right turn signal 70 at the sequencer 65 simultaneously resets the sequencer 65 and begins the 10-count cycle necessary for the operation of the wide turn signal 10.

When the wide turn signal 10 is in off-mode, a twelve-volt signal is present on outputs LED3 to LED7 and outputs LED8 and LED9. The presence of this voltage prevents the flow of current through light-emitting diodes 14 thereby maintaining the wide turn signal in off-mode. In order for each cluster 129 of light-emitting diodes 14 to be illuminated, a zero voltage signal must be received at each of the outputs LED3 through LED7 and LED8 and LED9, i.e. the voltage present on outputs LED3 through LED7 and LED8 and LED9 must drop to zero. Sequencer 65 successively drops the output voltage on each output LED3 through LED7 and LED8 and LED9 from twelve-volts to zero volts on successive counts of the ten-count cycle. The absence of a voltage on these outputs allows current from the power source 55 to flow through the clusters 129 back along each of the buffer outputs LED3 to LED9 to be ultimately grounded through the buffers 76 and 77 to ground connections G. At the end of the ten-count cycle maintained by the sequencer 65, each of the outputs Q0 through Q9 are reset thereby presenting again a twelve-volt signal at buffer outputs LED3 to LED9.

In the preferred embodiment of this invention, the clusters 129 are arranged to form an arrow 12 that is illuminated beginning with its tail and proceeding to the head of the arrow 12. Operation of the wide turn signal begins with the transmission of an electrical signal from the turn signal circuit 70 through the buffer 77 to the sequencer 65. This electrical signal initiates the first count of the sequencer's ten-count cycle. On the first count a voltage signal is sent to the strobe lamp 16 over output C-OUT thereby activating the strobe lamp 16, which will remain illuminated for the first five counts of the ten-count sequence whereupon the voltage signal on C-OUT drops to zero and the strobe illumination is extinguished. The cluster 129 corresponding to buffer output LED3 will be lit on the third count of the 10-count cycle maintained by the sequencer 65. The cluster 129 corresponding to buffer output LED3 will remain lit until the cycle maintained by the sequencer 65 reaches its end and is reset. Each cluster 129 is sequentially lit beginning with the cluster 129 corresponding to buffer output LED3 followed by the cluster 129 corresponding to LED4 and so on until all clusters 129 have been illuminated. As can be seen from FIG. 4b, because buffer outputs LED8 and LED9 have been coupled together, the cluster 129 corresponding to buffer outputs LED8 and LED9 will be illuminated on count nine and ten of the ten-count cycle maintained by the sequencer 65 after which the sequencer 65 will reset itself extinguishing all clusters 129 of light-emitting diodes 14.

In an alternate embodiment of the present invention, it is also possible to operate the strobe lamp 16 independent from the clusters 129 of light emitting diodes 14. (FIGS. 5a and 5b) In this alternate embodiment the control circuit 50 and the switching mechanism described above are modified as follows. Taking advantage of spare output connections on buffer 76, buffer 77 outputs LED 8 and LED 9 are removed from buffer 77 and connected to buffer 76. In this embodiment, all of the light emitting diodes 14 forming the arrow 12 are controlled through buffer 76. A connection 200 for activating the wide turn signal is made between the ground connection G of buffer 76 and the input of sequencer 65. A first connection to the power source 55 is made to the activating connector 200 immediately adjacent to buffer 76 and a second connection to the power source 55 is made between the sequencer 65 and the activating connector 200 immediately adjacent the sequencer 65. The buffer 77 output T SIG which corresponds to the right turn signal circuit 70 is also connected to the activating connection 200.

Figure 5A:
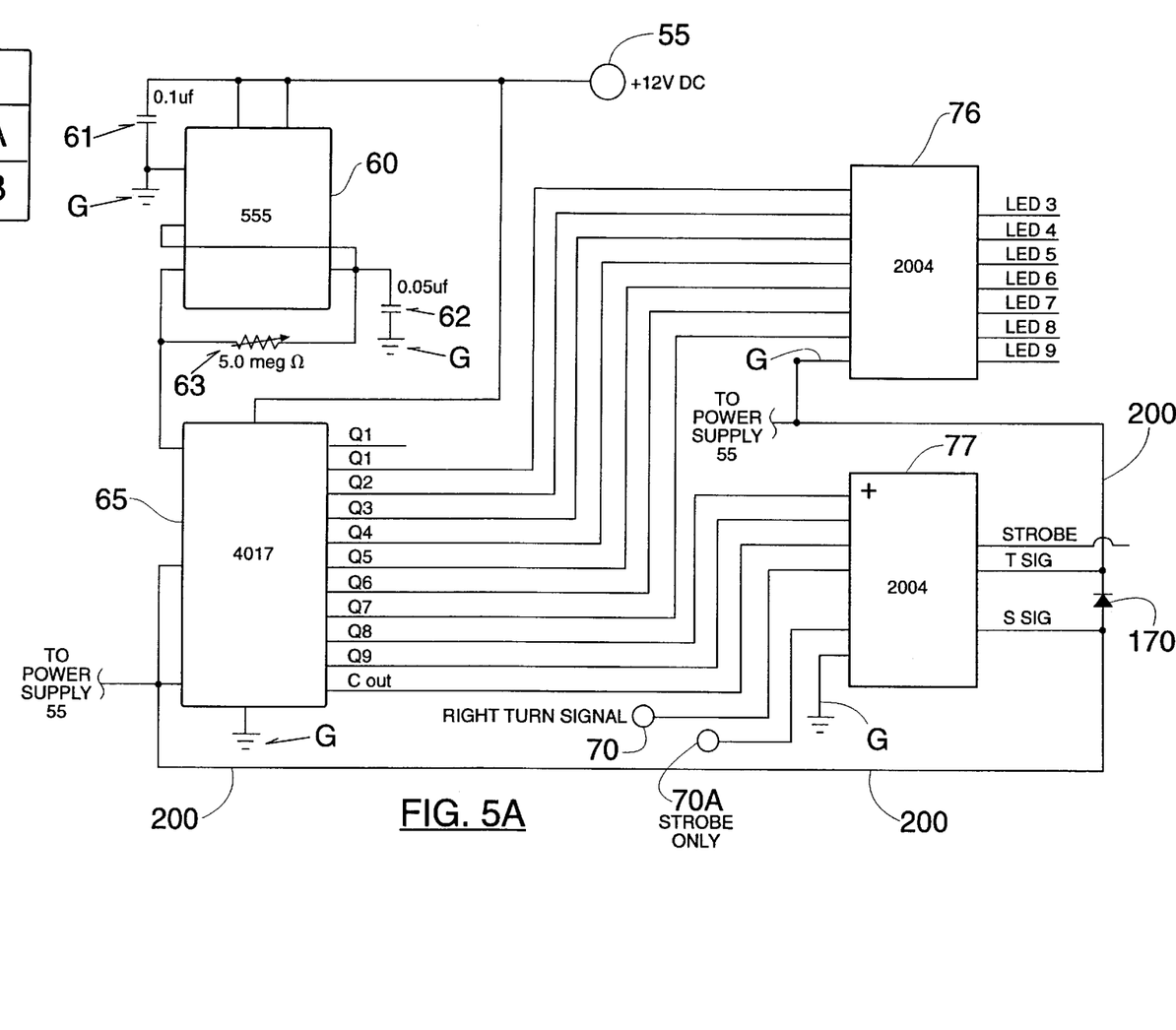
FIG. 5a is of a first portion of a wiring schematic view of a wide turn signal.
Figure 5B:
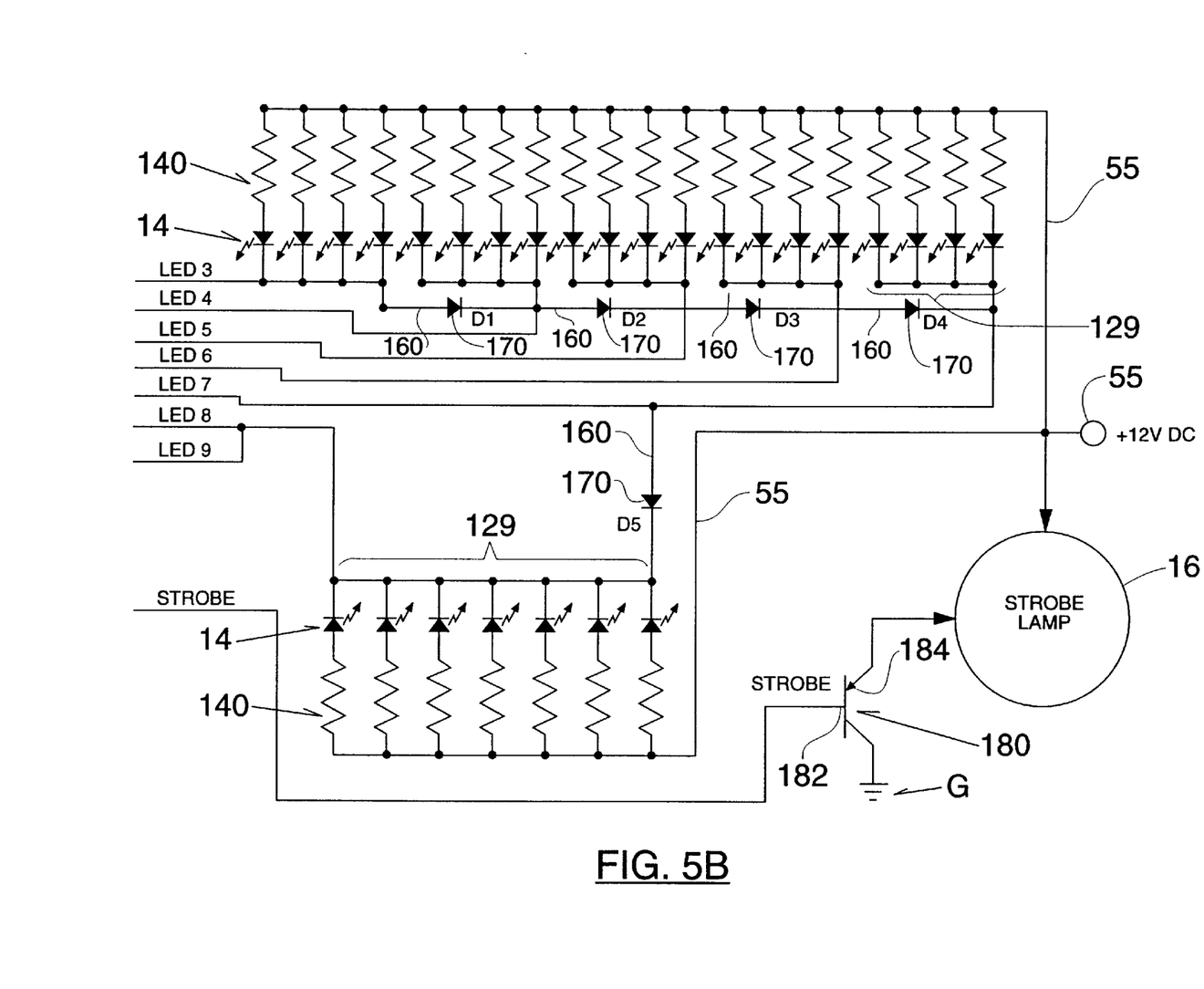
FIG. 5b is of a second portion of a wiring schematic view of a wide turn signal.

The strobe lamp 16 is to be activated by a manually operable switch that will be located within the reach of the driver of the cargo vehicle 30. The strobe switch transmits voltage signals to output buffer 77 by way of strobe switch circuit 70A. The output buffer 77 has an input for the strobe switch circuit 70A that corresponds to buffer 77 output S SIG. The output S SIG is connected to the activating connector 200. A diode 170 is connected in line with activating connection 200 between the outputs T SIG and S SIG, the diode 170 being biased towards output T SIG.

The structure of this alternate embodiment is such that when no voltage signals are being received by buffer 77 from the right turn signal circuit 70 or the strobe switch circuit 70A, the current provided to the activating connector 200 adjacent buffer 76 is prevented from flowing to ground and the current provided immediately adjacent the sequencer 65 acts to prevent the sequencer 65 from sending voltage signals to the buffers 76, 77. In this "off" state no current is flowing in the control circuit 50.

Where a voltage signal is applied to the buffer 77 from the right turn signal circuit 70 only, current supplied to the activating connector 200 by the power connections adjacent the sequencer 65 and buffer 76 is able to flow to ground through output T SIG, to the ground connection G of buffer 77. This results in a null voltage present upon the activating connector 200 where it is received by sequencer 65 and prompts the sequencer 65 to begin its prescribed counting cycle. This "on" state is identical to that described above for the preferred embodiment.

Finally, where a voltage is applied to the buffer 77 by the strobe switch circuit 70A, the strobe lamp 16 alone is activated. In this state the output S SIG is activated and becomes a path of least resistance for current flowing from the power connection to the activating connector 200 adjacent the sequencer 65 to the ground connection G of buffer 77. This results in a null voltage being present at the input to the sequencer 65, thereby activating the counting cycle of the sequencer 65. Though in this mode the strobe lamp 16 is operated in its normal fashion, because diode 170 is reverse biased towards current flowing from the power connection, buffer 76 is not grounded and no current is permitted to flow through light emitting diodes 14. This is the "strobe only" state.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A vehicular wide turn warning device comprising:

a placard having printed thereon a warning message, the placard also having mounted thereto a strobe lamp and a plurality of light-emitting mechanisms, the light-emitting mechanisms being arranged to form an arrow having a point and a tail;

a first control circuit for illuminating the strobe lamp and the light-emitting mechanisms:

said first control circuit being further comprised of a plurality of branches, each branch having a first end and a second end, the first end of each branch being connected to a common direct current power source, the second end of each branch being further connected to a respective output terminal of a grounded current amplifier wherein each branch has at least one light-emitting mechanism connected intermediate its ends, each branch being coupled to the succeeding branch by a jumper connection having a diode mechanism biased away from the preceding branch and each output terminal of the current amplifier respectively corresponding to an individual current amplifier input terminal;

a grounded synchronous counter being also connected to the power source and having a plurality of output terminals, each counter output terminal being coupled to a respective current amplifier input terminal;

a switching mechanism for activating said synchronous counter;

a grounded timer means coupled between the power source and the synchronous counter;

said switching mechanism is comprised of a turn signal arranged to be activated by a driver of a vehicle, the turn signal circuit having an output for activating the control circuit that conveys an electrical signal via the current amplifier to the synchronous counter, such that when an electrical signal is present on the turn signal circuit output, the control circuit is activated;

said switching mechanism further comprising a strobe switch circuit arranged to be independently activated by said driver;

said strobe switch circuit having an output for activating a second independent control circuit that conveys an electrical signal via the current amplifier to the synchronous counter, such that when an electrical signal is present on the strobe switch circuit output, the second control circuit is activated to independently operate said strobe lamp.

2. The vehicular wide turn warning device of claim 1 wherein the strobe lamp is cyclically illuminated independent from the light-emitting mechanisms.

3. A method of using a vehicular wide turn warning device comprising the steps of:

mounting on a vehicle having a rear portion and a first and second side portions at least two vehicular wide turn warning devices, at least one of the vehicular wide turn warning devices being mounted on the rear portion of the vehicle and at least one vehicular wide turn warning device being mounted on at least one of said side portions of the vehicle;

operating a switching mechanism so as to activate at least one of the vehicular wide turn warning devices;

providing a strobe lamp; and independently operating a switching mechanism for activating said strobe lamp on at least one of the vehicular wide turn warning devices.

* * * * *